(12) United States Patent
Sato et al.

(10) Patent No.: US 6,613,453 B2
(45) Date of Patent: Sep. 2, 2003

(54) LEAD-FREE JOURNAL BEARING

(75) Inventors: Issaku Sato, Tokyo (JP); Naoki Sato, Tochigi (JP)

(73) Assignee: Senju Metal Industry Co., Ltd., Tokyo (JP)

(*) Notice: Subject to any disclaimer, the term of this patent is extended or adjusted under 35 U.S.C. 154(b) by 0 days.

(21) Appl. No.: 10/106,848

(22) Filed: Mar. 27, 2002

(65) Prior Publication Data

US 2002/0142186 A1 Oct. 3, 2002

(30) Foreign Application Priority Data

Mar. 28, 2001 (JP) .................................. 2001-091650

(51) Int. Cl.[7] .......................... B32B 15/20; F16C 19/00
(52) U.S. Cl. .................. 428/676; 384/445; 384/456; 384/463; 384/912; 428/677; 428/328; 428/908.8
(58) Field of Search ................. 428/676, 677, 428/328, 908.8; 75/231, 243; 384/445, 456, 463, 912

(56) References Cited

U.S. PATENT DOCUMENTS

| | | | |
|---|---|---|---|
| 4,551,395 A | 11/1985 | Lloyd | 428/677 |
| 5,864,745 A | 1/1999 | Kawagoe et al. | 428/553 |
| 5,875,702 A | 3/1999 | Kawagoe et al. | 92/12.2 |
| 6,189,434 B1 | 2/2001 | Kawaguchi et al. | 92/71 |
| 6,309,759 B1 | 10/2001 | Tomikawa et al. | 428/642 |
| 6,492,033 B2 * | 12/2002 | Sato et al. | 428/677 |
| 2001/0055695 A1 * | 12/2001 | Sato et al. | 428/677 |

FOREIGN PATENT DOCUMENTS

EP 0795693 9/1997

* cited by examiner

Primary Examiner—Robert R. Koehler
(74) Attorney, Agent, or Firm—Michael Tobias

(57) ABSTRACT

A lead-free journal bearing includes a cylindrical ferrous backing and a bearing alloy layer comprising a bearing alloy powder consisting essentially of 7–13 mass percent of Sn, 0.7–2 mass percent of Ag, optionally at most 0.5 mass percent of molybdenum disulfide, optionally at most 2 mass percent of graphite, and a remainder of Cu sintered to an inner surface of the backing. The bearing is particularly suitable for use in construction equipment.

7 Claims, 4 Drawing Sheets

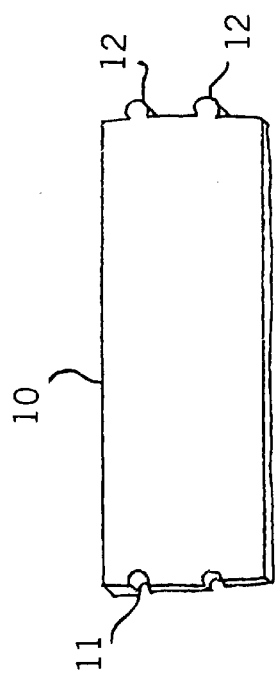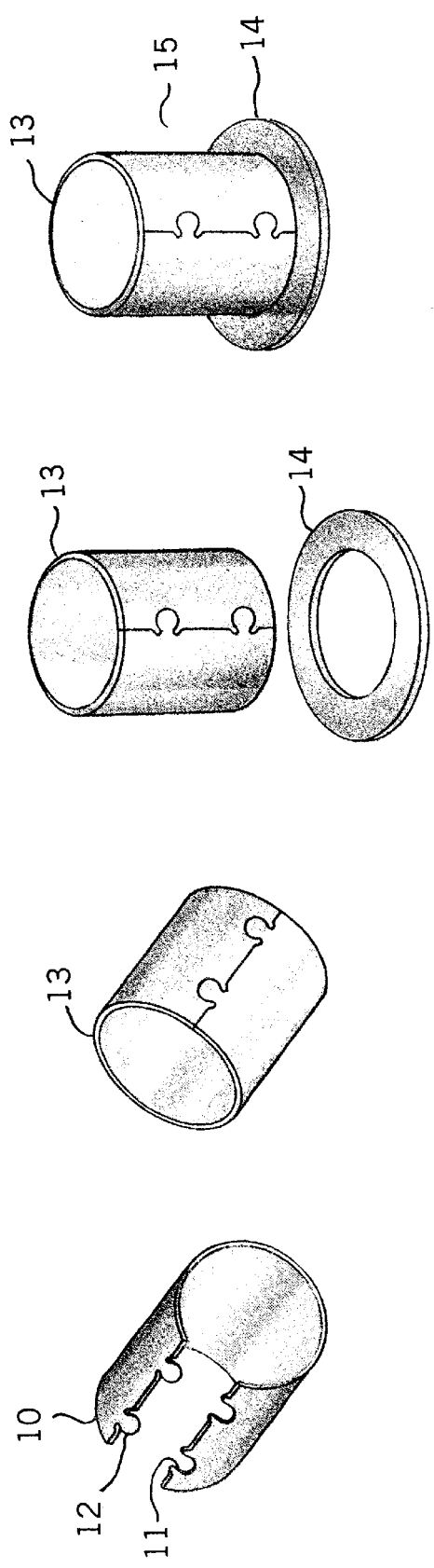
Fig. 5a
Fig. 5b
Fig. 5c
Fig. 5d
Fig. 5e

LEAD-FREE JOURNAL BEARING

BACKGROUND OF THE INVENTION

1. Field of the Invention

This invention relates to a journal bearing. While the bearing is not restricted to any particular use, it is especially advantageous when used in construction equipment such as power shovels and bulldozers.

2. Description of the Related Art

Certain types of construction equipment, such as power shovels or bulldozers, are equipped with tracks on their undercarriages to enable the equipment to travel over irregular surfaces and ascend steep grades. The weight of the construction equipment is transmitted to the tracks by shafts received in journal bearings mounted on the undercarriage, e.g., track rollers, and idlers.

Journal bearings used in construction equipment need to be able withstand large loads due to the large weight of such equipment and to be able to operate for long periods without seizing. In the past, journal bearings for construction equipment have typically been made from the bearing alloy LBC-3 (Cu-10Sn-10Pb), which has copper as a main component.

A journal bearing may be manufactured entirely of a bearing alloy, but a bearing alloy generally has copper, which is expensive and has limited mechanical strength, as a main component, so manufacturing a journal bearing entirely from a bearing alloy is not appropriate from the standpoints of economy and mechanical strength, particularly when the bearing is to be used in construction equipment. Therefore, a journal bearing for use in construction equipment typically has a bimetallic structure comprising a steel backing plate and a thin layer of a bearing alloy bonded to the backing plate. Steel is particularly suitable for use as the backing plate because it is inexpensive and has excellent mechanical strength.

Methods for joining a bearing alloy to a steel backing plate include the pressure method, the melting method, and the sintering method.

In the pressure method, a bearing alloy is formed into a sheet, and the bearing alloy sheet and a steel backing plate are stacked on each other and rolled with a strong force between rollers. The rolling causes the bearing alloy and the steel backing plate to approach each other on a molecular level and be joined to each other. A bimetallic material obtained in this manner is then punched with a press to obtain a rectangular member of a prescribed size, and then the rectangular bimetallic member is formed into a cylinder to obtain a journal bearing. In this method, the bonding strength between the bearing alloy and the steel backing plate can not be made sufficiently strong, so when a journal bearing obtained by this method is used in construction equipment and a high load is applied to it, there are cases in which the bearing alloy layer peels off the steel backing plate. Accordingly, a journal bearing obtained by the pressure method is not suitable for use in construction equipment.

In the melting method, a molten bearing alloy is cast atop a steel backing plate to join the backing plate and the bearing alloy to each other. In this method, the bearing alloy and the backing plate are metallically and strongly bonded to each other. However, when the bearing alloy has cooled and solidified, it has oxides remaining on its surface, so during solidification at the time of cooling, shrinkage cavities or irregularities can form in the surface thereof, so the surface of the bearing alloy must be machined to a considerable depth to smooth it. In addition, the steel backing plate is abruptly heated by the molten bearing alloy which is at a high temperature, and its surface oxidizes or deforms due to thermal strain, so the backing plate must also be machined to smooth it. A bimetallic material which is obtained in this manner is then punched with a press to obtain a rectangular member of a prescribed size, and then the rectangular member is formed into a cylinder to obtain a journal bearing. The melting method can obtain a strong bonding strength between the bearing alloy and the steel backing plate, but it is very troublesome to perform, and at the time of casting the molten bearing alloy, oxides can be included or shrinkage cavities can form, and there were cases in which these had an adverse effect on the bearing properties.

In the sintering method, a bearing alloy in the form of a powder is dispersed on a steel backing plate and is heated without being melted to join the powder to the backing plate by a diffusion phenomenon. A bimetallic member which is obtained by the sintering method has a strong bonding strength between the bearing alloy and the steel backing plate, and the sintering temperature can be made low, so there are few thermal effects on the steel backing plate or the bearing alloy. In addition, it is the most suitable method for manufacturing a journal bearing without defects such as inclusion of oxides or shrinkage cavities. Below, the steps in manufacturing a journal bearing by the sintering method will be briefly explained.

(1) Powder Dispersing Step

A bearing alloy powder is uniformly dispersed atop a backing in the form of a steel strip.

(2) First Sintering Step

The strip on which the bearing alloy powder is dispersed is passed through a sintering furnace. The sintering furnace is at a temperature slightly higher than the solidus temperature of the bearing alloy so as not to completely melt the bearing alloy, and the interior of the furnace is filled with a reducing atmosphere of a reducing gas such as hydrogen gas. If the strip on which the bearing alloy powder is dispersed is heated under these conditions, the bearing alloy powders are joined to each other and the steel backing plate and the bearing alloy powder are joined to each other by the diffusion phenomenon.

(3) First Rolling Step

In the first sintering step, the bearing alloy powder which is dispersed on the metal plate is not completely melted, and the spaces between the bearing alloy powder form a porous bearing alloy layer, so in this state, the strip can not be used as a journal bearing. This is because the bearing alloy layer is porous, so when a high load is applied to it, the porous portion breaks down and deforms, contact between the bearing alloy layer and a shaft received by the bearing becomes non-uniform, i.e., it becomes lopsided, and the shaft may be damaged. Therefore, rolling is carried out to crush the porous portion. First rolling is carried out by passing the strip which was sintered in the first sintering step between a pair of upper and lower rollers. It is necessary to completely crush the porous portion present on the bearing alloy layer of the strip, so rolling is carried out with a large reduction ratio.

(4) Second Sintering Step

If a journal bearing is manufactured by carrying out only the first rolling, there are cases in which breakdown occurs from the interior of the bearing layer and the bearing layer peels off. The cause of this breakdown is that the porous portion which was crushed by the first rolling step is not metallically bonded to itself or to the backing, and when a high load is applied, breakdown occurs in the porous portion. Therefore, a second sintering step is carried out in order to metallically join the crushed porous portion to itself and to the backing. Second sintering is carried out under the same conditions as for the first sintering step.

(5) Second Rolling Step

During the second sintering step, the bearing alloy and the steel backing plate are annealed and their hardness decreases, so if the strip were used as a bearing with no further treatment, under a heavy load, the bearing alloy layer could be abraded or deformed. Therefore, second rolling is carried out after the second sintering step in order to increase the hardness and to adjust the thickness of the strip. The second rolling step is carried out with the same rollers as for the first rolling step, but the rolling reduction is smaller than for the first rolling step.

(6) Mechanical Working Step

A strip which is given a prescribed hardness and thickness by the second rolling step is cut to a prescribed width and length, and it is then subjected to mechanical working including rough rounding, finish rounding, machining of the interior surface, and the like to obtain a journal bearing. When the journal bearing is used in the undercarriage of tracked construction equipment, an annular flange is usually joined to one end of the journal bearing.

As mentioned above a conventional journal bearing typically employs LBC-3 (Cu-10Sn-10Pb) as a bearing alloy. LBC-3 is an appropriate material for a journal bearing used to support a shaft operating at a high speed and under a low load, but when LBC-3 is used in a journal bearing which supports a shaft operating at a low speed and under a high load such as in construction equipment, there are cases in which seizing occurs. In addition, LBC-3 contains lead, so it is potentially a source of environmental pollution. For example, when a power shovel is used for construction of a river embankment, a journal bearing made of LBC-3 may cause not only water pollution due to oil leaks but also lead contamination. If a journal bearing and a shaft in the undercarriage of construction equipment undergo seizing, the journal bearing reaches a high temperature due to the heat of friction. The heat may cause an oil seal to deteriorate, and lubricating oil may leak from the seal and mix with river water. During use of construction equipment, lead in a bearing alloy made of LBC-3 is abraded and dispersed in oil, or the lead is heated to a high temperature and is chemically modified by the oil and is dissolved in the oil. Accordingly, if construction equipment leaks oil during construction at a river embankment, oil which contains lead mixes with river water. If the river water is used as drinking water by humans, the lead can accumulate in the human body and cause lead poisoning.

Another possibility for environmental pollution occurs when equipment including bearings containing an LBC-3 bearing alloy is discarded. When construction equipment breaks down or becomes old and can no longer function adequately, it is disassembled, and parts which can still function are reused. In a device such as construction equipment in which much of the constituent components are metal, the metals are classified by type and recovered. However, in a journal bearing, the bearing alloy and the steel backing plate are metallically bonded to each other, so they cannot be separated from one another, so a journal bearing cannot be reused as either a steel plate or as a copper alloy. Journal bearings which can not be reused can only be disposed of by burial, in which case the lead becomes an environmental problem. Namely, if a lead-containing journal bearing is buried underground and comes into contact with acid rain (rain having a high acidity due to dissolving oxides of sulfur and nitrogen present in the atmosphere), the acid rain dissolves lead from the bearing alloy in the journal bearing, and the dissolved lead seeps into the ground and pollutes underground water. If underground water which is polluted by lead in this manner is drunk by humans, there is the danger of its causing lead poisoning. Therefore, in recent years, there has been a strong desire in the construction equipment industry for a journal bearing which does not contain lead, i.e., a so-called "lead-free journal bearing".

SUMMARY OF THE INVENTION

In LBC-3 used in conventional journal bearings, lead is scattered in the matrix of the copper alloy. As a shaft rotates in the journal bearing, the lead is stretched and becomes thin as if the surface of the bearing alloy were covered with oil, and this causes the shaft to smoothly rotate. Lead which performs this action is described as a solid lubricant. The present inventors found that even if there is not a solid lubricating effect by covering the surface of the bearing alloy with lead, if the properties of the bearing alloy are changed, the bearing alloy can withstand a heavy load without seizing taking place. Specifically, the inventors found that if a small amount of Ag is added to a Cu—Sn alloy, excellent bearing properties not possessed by LBC-3 are obtained.

According to one form of the present invention, a lead-free journal bearing comprises a cylindrical ferrous backing and a bearing alloy layer comprising a bearing alloy powder consisting essentially of 7–13 mass percent of Sn, 0.7–2 mass percent of Ag, and a remainder of Cu sintered to an inner surface of the backing.

According to another form of the present invention, a lead-free journal bearing comprises a cylindrical ferrous backing and a bearing alloy layer comprising a bearing alloy powder consisting essentially of 7–13 mass percent of Sn, 0.7–2 mass percent of Ag, at most 0.5 mass percent of molybdenum disulfide and/or at most 2 mass percent of graphite, and a remainder of Cu sintered to an inner surface of the backing.

In preferred embodiments, the bearing alloy layer preferably has a Vickers hardness of at least 100 HV, and the joining strength between the backing and the bearing alloy layer is preferably at least 200 MPa.

The bearing includes at least a cylindrical portion for receiving a shaft and supporting a radial load. The bearing may also include other portions, such as an annular flange disposed at one end of the cylindrical portion for receiving a thrust load.

BRIEF DESCRIPTION OF THE DRAWINGS

FIGS. 5a–5e are axonometric views schematically illustrating different steps in the manufacture of a journal bearing according to the present invention.

DESCRIPTION OF PREFERRED EMBODIMENTS

A lead-free journal bearing according to this invention has a bearing alloy layer with Cu—Sn—Ag as a basic composition. If the amount of Sn in the bearing alloy layer is less than 7 mass percent, the solidus temperature becomes high and it becomes necessary to increase the sintering temperature. As a result of the increased sintering temperature, not only does the steel backing plate decrease in mechanical strength due to thermal effects, but the bonding strength of the bearing alloy layer to the steel backing plate also decreases. On the other hand, if the amount of Sn exceeds 13 mass percent, the solidus temperature decreases too much, and adequate sintering becomes impossible, so in this case as well, the bonding strength ends up decreasing.

Figure 1:
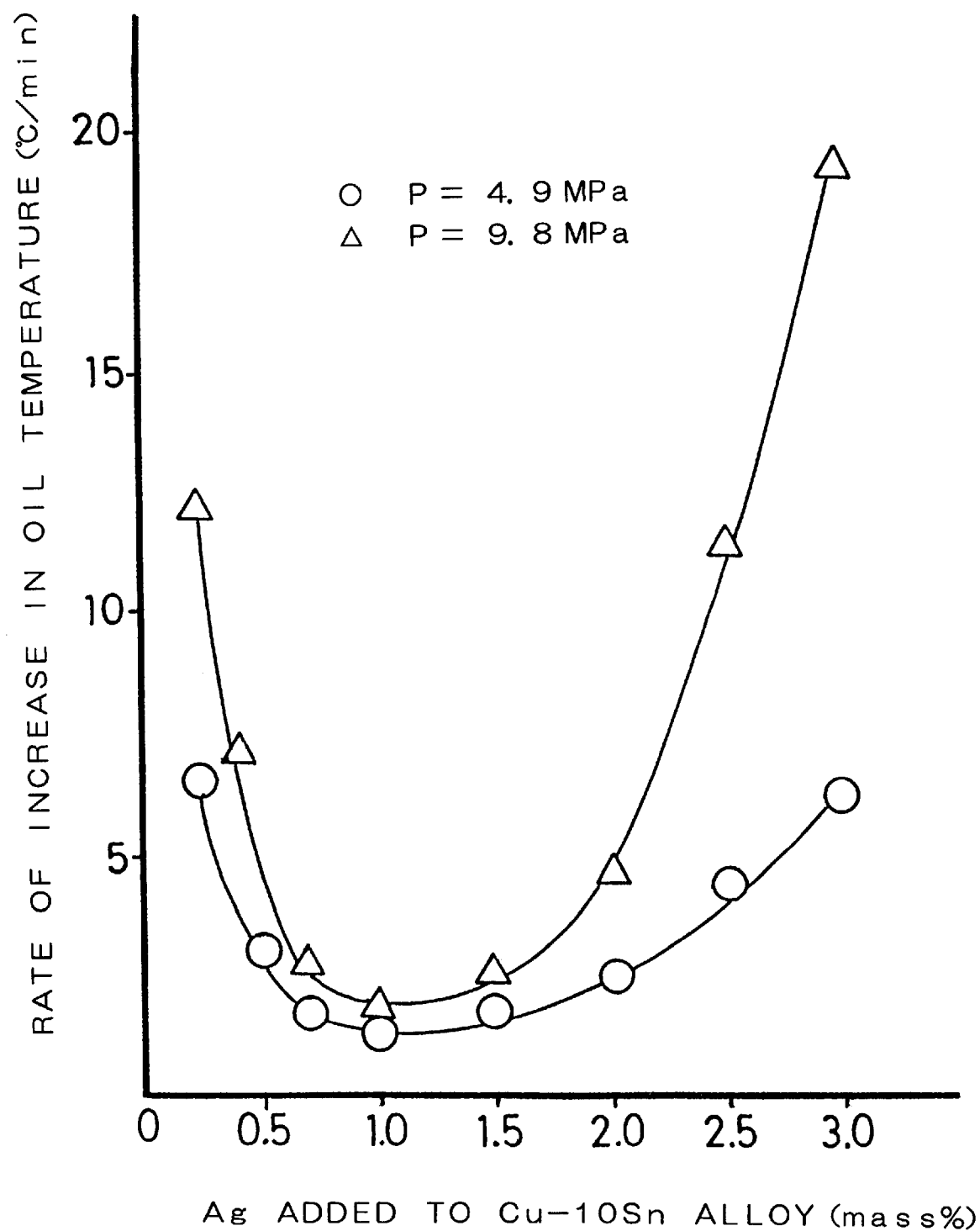
FIG. 1 is a graph showing the rate of increase in the temperature of lubricating oil as a function of the Ag content in a Cu-10Sn—Ag bearing alloy.

If the amount of Ag in the bearing alloy layer is less than 0.7 mass percent, adequate seizing resistance is not obtained, and seizing takes place under high loads. Seizing also occurs if the amount of Ag exceeds 2 mass percent. FIG. 1 is a graph showing the rate of increase in the oil temperature in a bearing as a function of the amount of Ag added to a Cu-10Sn alloy. As is clear from FIG. 1, whether the bearing surface pressure is 4.9 MPa or 9.8 MPa, the rate of increase of the oil temperature is low when the amount of Ag is 0.7–2 mass percent. The rate of increase of the oil temperature is a good indication of whether seizing is taking place. In construction equipment, the interior of a journal bearing is filled with oil for lubricating the bearing. If the friction between the journal bearing and a shaft becomes large, frictional heat is generated, and the oil temperature increases. The increase in the oil temperature is evidence that friction is increasing, so it is a warning of seizing.

In the present invention, if a solid lubricant such as molybdenum disulfide and graphite is mixed with a Cu—Sn—Ag alloy, a journal bearing having even more superior bearing properties is obtained. If at most 0.5 mass percent of molybdenum disulfide and/or at most 2 mass percent of graphite are mixed with a Cu—Sn—Ag alloy, the occurrence of seizing becomes rare.

In a lead-free journal bearing according to the present invention, the bearing alloy layer preferably has a Vickers hardness of at least 100 HV. If the Vickers hardness of the bearing alloy layer is less than 100 HV, when a heavy load is applied, the bearing alloy layer deforms, contact with a shaft supported by the bearing becomes non-uniform, and seizing ends up taking place.

In a lead-free journal bearing according to the present invention, the bonding strength between the bearing alloy and the backing plate is preferably at least 200 MPa. If the bonding strength is smaller than 200 MPa, when a heavy load is applied, the bearing alloy layer ends up peeling from the backing plate.

A journal bearing according to the present invention may be manufactured by a method similar to that described above, including the above-described steps (1)–(6), for the manufacture of a conventional journal bearing by the sintering method. As part of the mechanical working step in that method, a rectangular plate which has been cut to a suitable size is formed into a cylindrical shape, and the opposing ends of the plate are secured to each other to form a cylindrical portion of the bearing. A variety of methods can be used to secure the ends of the plate to each other, but a clinch-butt joint is particularly suitable because it avoids the adverse heat effects which may be associated with welding. An annular flange, if desired, may be secured to one end of the cylindrical portion. Various methods can be used to secure the flange to the cylindrical portion, with friction pressure welding being particularly suitable because it does not require the use of intermediate materials.

FIGS. 5a–5e are axonometric views schematically illustrating a workpiece being subjected to different mechanical processes which can be part of the mechanical working step (Step 6) in forming a journal bearing according to the present invention. FIG. 5a shows a rectangular workpiece 10 which has been formed by subjecting a strip which has passed through Steps (1)–(5) to slitting and punching. During the punching process, opposite ends of the workpiece 10 are formed into a shape suitable for forming a clinch-butt joint. Specifically, circular recesses 11 are formed at one end of the workpiece 10, and circular projections 12 shaped for engagement with the recesses 11 are formed at the other end. At this time, various holes, such as lubricating openings, may also be formed in the workpiece 10 if desired. FIG. 5b shows the workpiece 10 of FIG. 5a being formed into a cylindrical shape with the bearing alloy layer of the workpiece 10 on the inner side of the cylinder. FIG. 5c shows the workpiece 10 after the recesses 11 and the projections 12 at the opposing ends of the workpiece 10 have been secured to each other by a clinch-butt joint to form a cylinder 13. FIG. 5d shows the cylinder 13 being joined to an annular flange 14 having a bearing alloy layer on the side facing away from the cylinder 13 (its lower side), and FIG. 5e shows a completed journal bearing 15 in which the cylinder 13 and the flange 14 are secured to each other.

EXAMPLES

Next, an example of a method of manufacturing a journal bearing according to the present invention will described. The purpose of each step in this method is the same as described above with respect to the sintering method for forming a conventional journal bearing.

In a dispersing step, a Cu-10Sn-1Ag bearing alloy powder having a particle size of less than 45 micrometers was uniformly dispersed to a thickness of 1 millimeter on a steel backing plate in the form of a strip (SPCC) having a width of 180 millimeters and a thickness of 3 millimeters. A first sintering step was carried out by passing the strip and the powder through a sintering furnace at 850° C. containing a hydrogen reducing atmosphere created by breakdown of ammonia gas. After the first sintering step, the strip was subjected to a first rolling step with rolls at a rolling reduction of 10 percent. After the first rolling step, a second sintering step was carried out in the same sintering furnace as for the first sintering step, and then a second rolling step was carried out with rollers using a reduction ratio of 3 percent. The Vickers hardness of the bearing alloy layer was HV 120, and the sheer strength was 230 MPa. The strip comprising a steel backing plate bonded to a bearing alloy layer was cut with a slitter to a width of 65 millimeters, and a rectangular piece having a length of 200 millimeters and a width of 65 millimeters was punched from the strip with a press. Both ends of the rectangular piece were formed into a shape suitable for forming a clinch-butt joint. Specifically, roughly circular projections were formed at one end of the rectangular piece, and recesses having approximately the same shape as the projections were formed at the other end of the rectangular piece. The rectangular piece was then formed into a cylinder with the bearing alloy layer on the interior of the cylinder, and the projections were engaged with the recesses to form a clinch-butt joint.

When a journal bearing is used as a bush in the undercarriage of construction equipment, the journal bearing rotates with respect to a stationary shaft. The journal bearing receives not only a radial load but also a thrust load, so an annular flange is usually joined to one end of the journal bearing. An example of the flange is an annular steel backing plate bonded to a bearing alloy layer like that used to form the cylindrical portion of a journal bearing according to the present invention. The inner surface of the journal bearing preferably has a minute clearance from the shaft so as not to damage it. Therefore, the interior surface of the journal bearing is precisely finished by machining.

A lead-free journal bearing according to the present invention manufactured as described above and a journal bearing using LBC-3 were tested for the rise in lubricating oil temperature during operation of the bearing. The test apparatus and the test conditions were as follows.

Test Apparatus: Track roller test machine (oil volume: 200 cc). The oil temperature was measured by inserting a thermocouple into the oil supply hole in the collar.

Journal Bearing: Inner diameter of 60.26 millimeters

Shaft: Outer diameter of 59.95 millimeters.

Test Conditions: The load during operation was a repeated dynamic load. The load in terms of the bearing surface pressure was varied in a single step between a lower limit of 2.5 MPa and an upper limit of 4.9 MPa. The load time was 30 seconds per one cycle, and the roller speed was 3 kilometers per hour.

Figure 2:
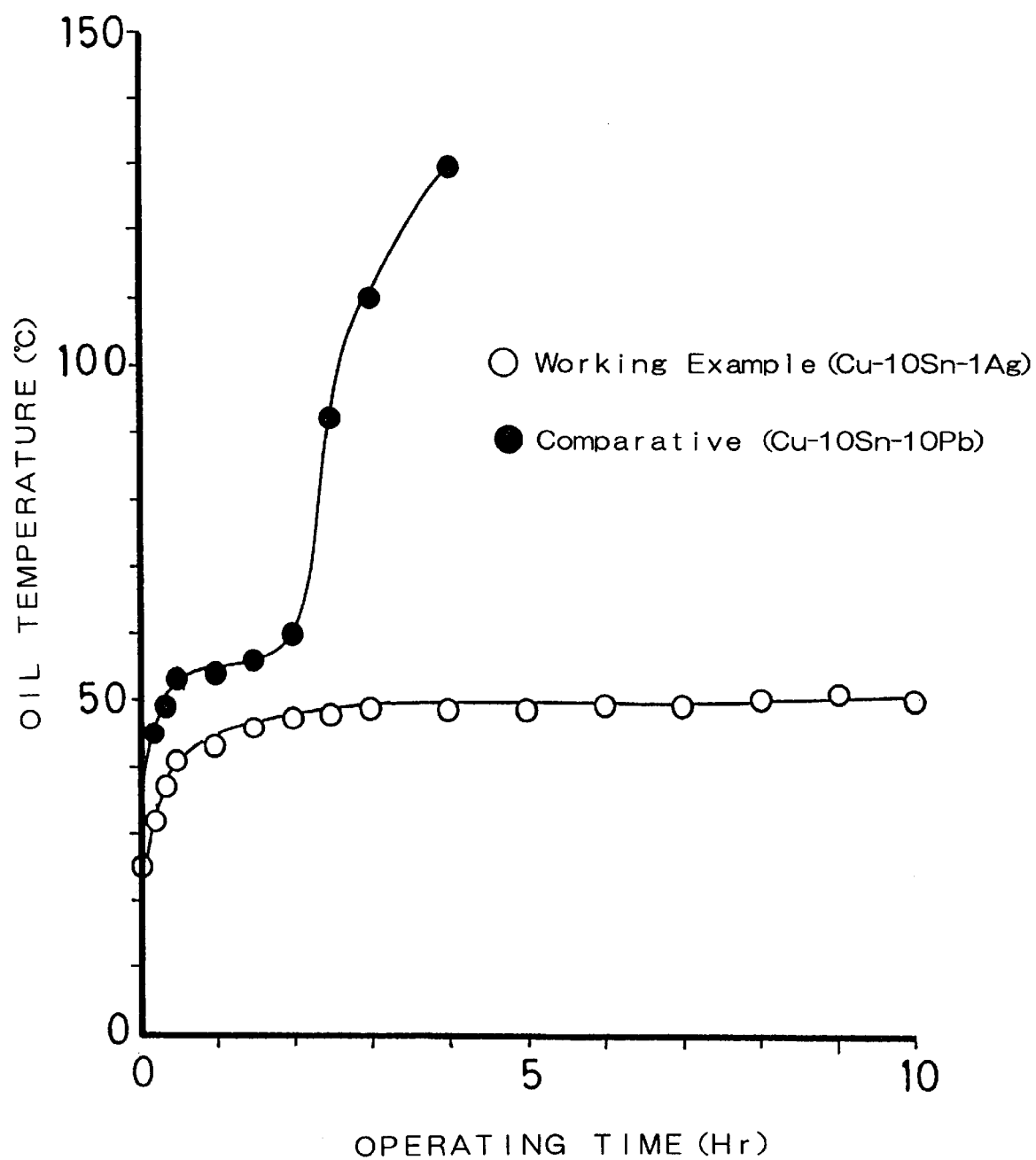
FIG. 2 is a graph of the temperature of lubricating oil used to lubricate a journal bearing as a function of the length of operation of a journal bearing according to the present invention and a conventional journal bearing.
Figure 3:
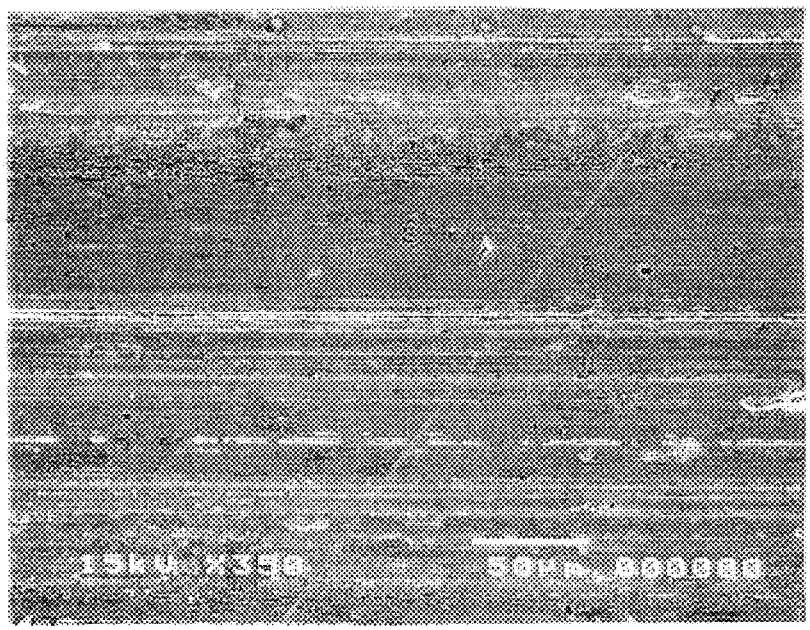
FIG. 3 is a photomicrograph of the texture of a lead-free journal bearing according to the present invention after 10 hours of operation.
Figure 4:
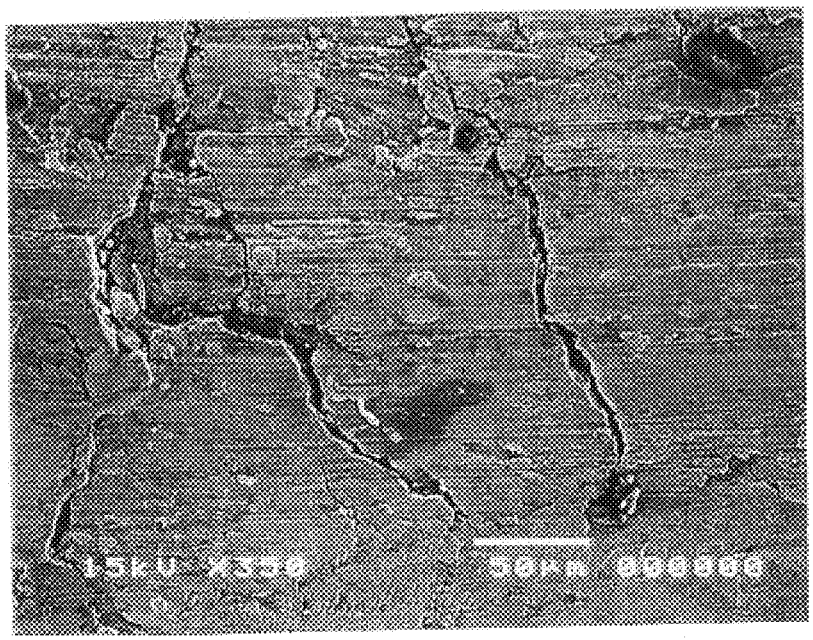
FIG. 4 is a photomicrograph of the texture of a journal bearing using LBC-3 after 5 hours of operation.

FIG. 2 is a graph showing the relationship between the oil temperature and the operating time. As is clear from FIG. 2, for the lead-free journal bearing according to the present invention, there was a rapid rise in temperature up to one hour of operation, but there was no subsequent increase in temperature after that, and the temperature remained in equilibrium even after 10 hours of operation. When the microstructure of the bearing alloy layer was investigated after 10 hours of operation, as shown in FIG. 3, there were absolutely no abnormalities in the texture of the bearing alloy layer. The journal bearing using LBC-3 had a rapid increase in temperature in 1 hour, and then after 2 hours there was a further abrupt increase in the temperature, and at 4 hours it exceeded 130° C. When the operation of this journal bearing was continued, seizing occurred at 5 hours of operation, and as shown in FIG. 4, cracks developed in the bearing alloy layer.

In conventional journal bearings, lead was thought to be indispensable for covering the bearing surface and functioning as a solid lubricant for smooth rotation of a shaft. However, even though a lead-free journal bearing according to the present invention does not contain lead, it has superior bearing properties to a conventional journal bearing comprising LBC-3. Furthermore, a lead-free journal bearing according to the present invention does not contain harmful substances that are a problem with respect to environmental pollution, so during construction of river embankments, even if oil leaks from a journal bearing according to the present invention and the oil mixes with river water, harmful substances do not pollute the river water. In addition, when equipment including a journal bearing according to the present invention is discarded and the journal bearing is disposed of by burial underground, the journal bearing does not pollute underground water even when contacted by acid rain.

What is claimed is:

1. A lead-free journal bearing comprising a cylindrical ferrous backing and a bearing alloy layer comprising a bearing alloy powder consisting essentially of 7–13 mass percent of Sn, 0.7–2 mass percent of Ag, and a remainder of Cu sintered to an inner surface of the backing.

2. A bearing as claimed in claim 1 wherein the bearing alloy layer has a Vickers hardness of at least 100 HV.

3. A bearing as claimed in claim 1 wherein a joining strength between the backing and the bearing alloy layer is at least 200 MPa.

4. A bearing as claimed in claim 1 wherein the bearing alloy contains a solid lubricant.

5. A lead-free journal bearing comprising a cylindrical ferrous backing and a bearing alloy layer comprising a bearing alloy powder consisting essentially of 7–13 mass percent of Sn, 0.7–2 mass percent of Ag, at most 0.5 mass percent of molybdenum disulfide and/or at most 2 mass percent of graphite, and a remainder of Cu sintered to an inner surface of the backing.

6. A bearing as claimed in claim 5 wherein the bearing alloy layer has a Vickers hardness of at least 100 HV.

7. A bearing as claimed in claim 5 wherein a joining strength between the backing and the bearing alloy layer is at least 200 MPa.

* * * * *